(12) United States Patent
Cheng (10) Patent No.: US 11,333,934 B2
(45) Date of Patent: May 17, 2022

(54) DISPLAY DEVICE

(71) Applicant: Innolux Corporation, Miao-Li County (TW)

(72) Inventor: Pai-Chiao Cheng, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 71 days.

(21) Appl. No.: 16/158,396

(22) Filed: Oct. 12, 2018

(65) Prior Publication Data

US 2019/0155076 A1  May 23, 2019

(30) Foreign Application Priority Data

Nov. 23, 2017  (CN) .......................... 201711183637.9

(51) Int. Cl.
| | | |
|---|---|---|
| *G02F 1/1339* | (2006.01) | |
| *G02F 1/1333* | (2006.01) | |
| *G02F 1/1335* | (2006.01) | |

(52) U.S. Cl.
CPC ...... *G02F 1/1339* (2013.01); *G02F 1/133308* (2013.01); *G02F 1/133512* (2013.01); *G02F 1/13332* (2021.01); *G02F 1/133311* (2021.01); *G02F 1/133331* (2021.01);
(Continued)

(58) Field of Classification Search
USPC ........................................................ 349/153
See application file for complete search history.

(56) References Cited

U.S. PATENT DOCUMENTS

| | | |
|---|---|---|
| 6,801,293 B1 | 10/2004 | Nishiyama et al. |
| 7,857,673 B2 | 12/2010 | Negishi |
| 8,410,484 B2 | 4/2013 | Park et al. |
| (Continued) | | |

FOREIGN PATENT DOCUMENTS

| | | |
|---|---|---|
| CN | 1378657 A | 11/2002 |
| CN | 101617564 A | 12/2009 |
| (Continued) | | |

OTHER PUBLICATIONS

EPO Search Report dated Feb. 27, 2019 in EP application (No. 18200165.1-1210).
(Continued)

*Primary Examiner* — Edward J Glick
*Assistant Examiner* — David Y Chung
(74) *Attorney, Agent, or Firm* — McClure, Qualey & Rodack, LLP (57) ABSTRACT

A display device includes a substrate, a plurality of sub-pixels and a covering layer. The substrate includes a display area and a peripheral area. The peripheral area is adjacent to the display area. The sub-pixels are disposed in the display area and arranged along a first direction. The sub-pixels have a first color, and two adjacent one of the sub-pixels have a first pixel pitch along the first direction. The covering layer is disposed in the peripheral area and has a first recess. The first recess has a first portion extended along a second direction perpendicular to the first direction. The first portion has a first width along the first direction. A ratio of the first width to the first pixel pitch is greater than or equal to 0.05 and less than or equal to 0.7.

1 Claim, 6 Drawing Sheets

(52) U.S. Cl.
CPC .. *G02F 1/133357* (2021.01); *G02F 1/133388* (2021.01); *G02F 2201/50* (2013.01)

(56) References Cited

U.S. PATENT DOCUMENTS

| | | | |
|---|---|---|---|
| 8,766,269 | B2 | 7/2014 | Yamazaki et al. |
| 10,014,490 | B2 | 7/2018 | Jin et al. |
| 10,177,176 | B2 | 1/2019 | Kim et al. |
| 10,310,309 | B2 | 6/2019 | Igeta et al. |
| 2007/0279552 | A1* | 12/2007 | Olczak ................. G02B 6/0053 349/95 |
| 2009/0147198 | A1 | 6/2009 | Kanaya et al. |
| 2009/0237775 | A1 | 9/2009 | Ito et al. |
| 2010/0134731 | A1* | 6/2010 | Jeon .................... G02F 1/13624 349/110 |
| 2014/0028961 | A1* | 1/2014 | Yanagisawa ...... G02F 1/136286 349/106 |
| 2015/0042929 | A1* | 2/2015 | Oke ................. G02F 1/133512 349/106 |
| 2015/0331292 | A1* | 11/2015 | Yang ................. G02F 1/133512 349/40 |
| 2016/0041436 | A1* | 2/2016 | Igeta ................. G02F 1/133512 349/58 |
| 2016/0081206 | A1 | 3/2016 | Zhang |
| 2016/0363809 | A1* | 12/2016 | Kesho ............... G02F 1/133512 |
| 2017/0279075 | A1* | 9/2017 | Chen ..................... G02F 1/1339 |
| 2017/0299916 | A1* | 10/2017 | Kobayashi ........ G02F 1/133345 |
| 2018/0026218 | A1* | 1/2018 | Kobayashi ........... G09G 3/3266 349/143 |
| 2018/0074353 | A1* | 3/2018 | Hirata ............... G02F 1/136286 |
| 2019/0121180 | A1* | 4/2019 | Ohashi .................. G06F 3/0412 |

FOREIGN PATENT DOCUMENTS

| | | |
|---|---|---|
| CN | 104240607 A | 12/2014 |
| CN | 106200091 A | 12/2016 |
| CN | 106646995 A | 5/2017 |
| CN | 106784377 A | 5/2017 |
| JP | 4726605 B2 | 7/2011 |
| KR | 20150080064 A | 7/2015 |

OTHER PUBLICATIONS

CN Office Action dated Aug. 19, 2020 in Chinese application (No. 201711183637.9).

* cited by examiner

DISPLAY DEVICE

This application claims the benefit of People's Republic of China application Serial No. 201711183637.9, filed Nov. 23, 2017, the subject matter of which is incorporated herein by reference.

BACKGROUND

Technical Field

The disclosure relates in general to a display device, and more particularly to a display device having recess design in a peripheral area.

Description of the Related Art

People's pursuit after high brightness and high color saturation for the display quality dominates the development and application of the color display technology. In everyday life, the applications of display such as advertising board, TV, and vehicle navigation can be seen everywhere. From the cathode ray tube (CRT) screen, plasma screen to the liquid crystal screen, many types of display screens have been provided. Therefore, how to provide a display device with good quality or manufacturing competiveness has become a prominent task for the industries.

SUMMARY

The disclosure is directed to a display device. According to the design of the embodiments of the present disclosure, the covering layer in the peripheral area has a recess which may interfere with the moisture or charges of the covering layer to move to the display area from the peripheral area. Thus, the display area may be less interfered by charges or moisture, the abnormalities of the display frame may be reduced, or the lifespan of the display device may be prolonged.

According to one embodiment of the disclosure, a display device including a substrate, a plurality of sub-pixels and a covering layer is provided. The substrate includes a display area and a peripheral area. The peripheral area is adjacent to the display area. The sub-pixels are disposed in the display area and arranged along a first direction. The sub-pixels have a first color, and two adjacent ones of the sub-pixels have a first pixel pitch along the first direction. The covering layer is disposed in the peripheral area and has a first recess. The first recess has a first portion extended along a second direction perpendicular to the first direction. The first portion has a first width along the first direction. A ratio of the first width to the first pixel pitch is greater than or equal to 0.05 and less than or equal to 0.7.

The above and other aspects of the disclosure will become preferred but non-limiting embodiment(s). The following description is made with reference to the accompanying drawings.

DETAILED DESCRIPTION

A number of embodiments of the present disclosure are disclosed below with reference to accompanying drawings. However, the structure and content disclosed in the embodiments are for exemplary and explanatory purposes only, and the scope of protection of the present disclosure is not limited to the embodiments. Designations common to the accompanying drawings and embodiments are used to indicate identical or similar elements. Anyone skilled in the technology field of the disclosure will be able to make suitable modifications or changes based on the specification disclosed below to meet actual needs.

Figure 1:
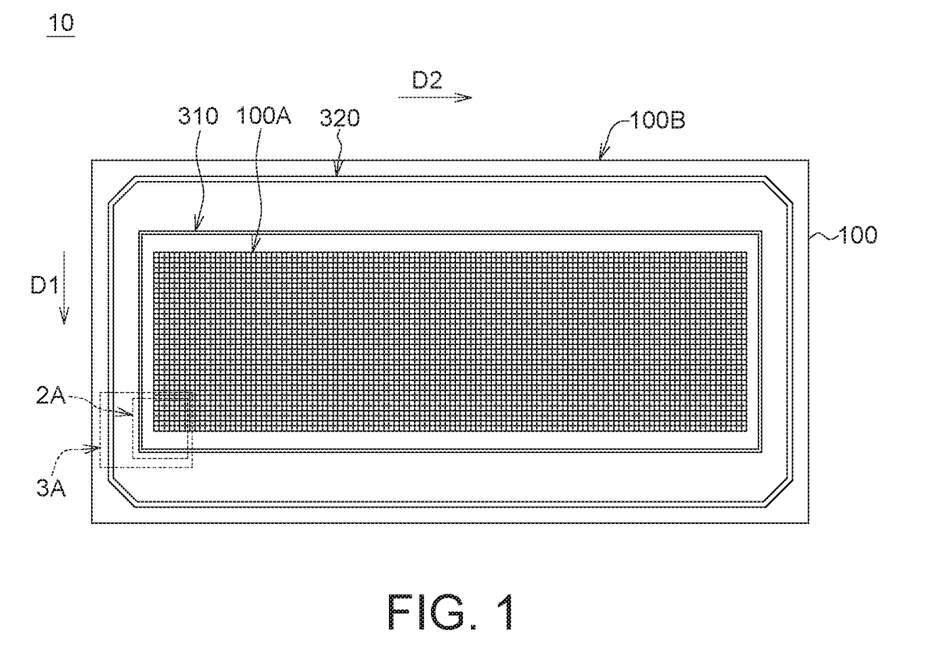
FIG. 1 is a top view of a display device according to an embodiment of the present disclosure.
Figure 2A:
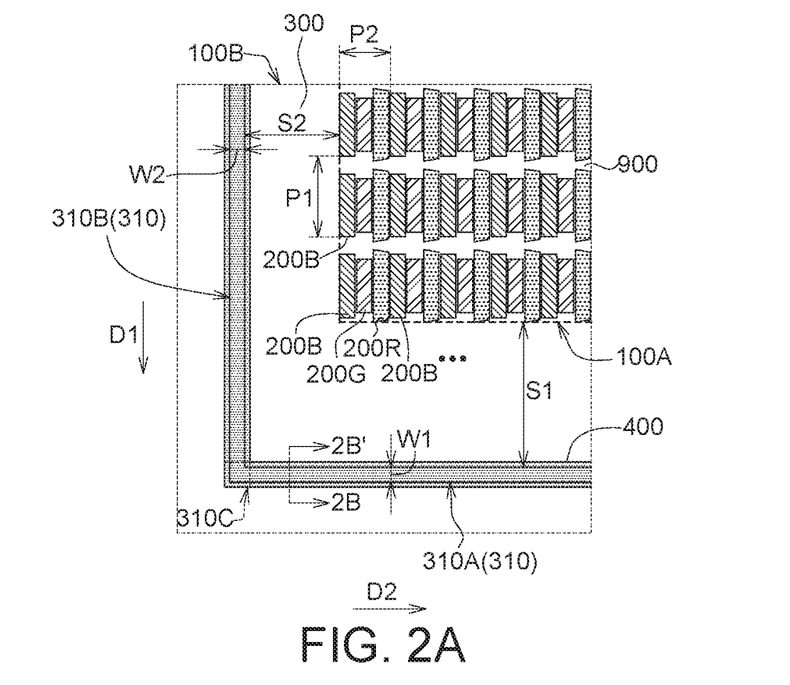
FIG. 2A is an enlarged view of the region 2A of FIG. 1.
Figure 2B:
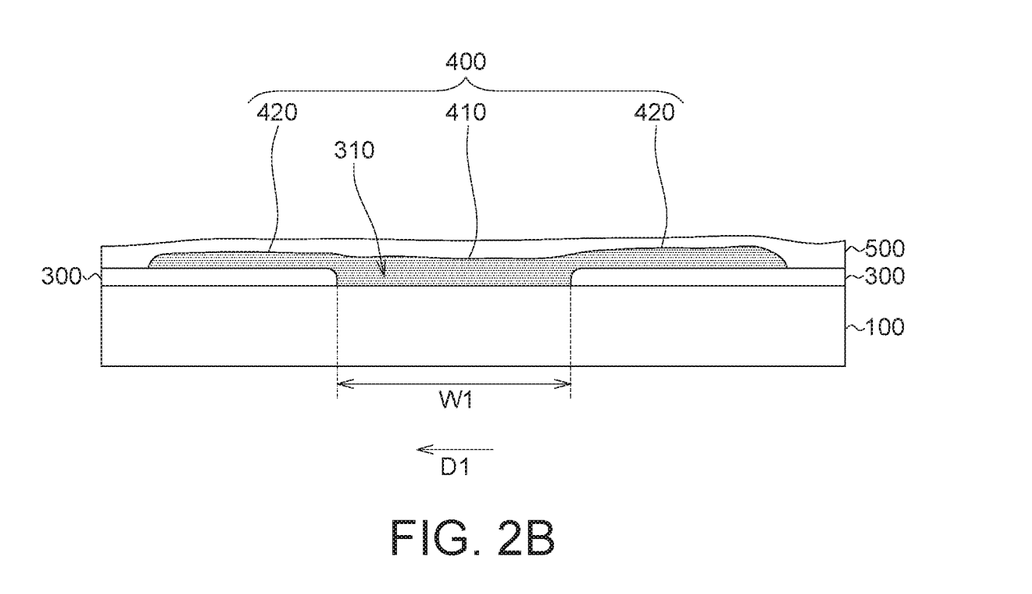
FIG. 2B is a cross-sectional view along the cross-sectional line 2B-2B' of FIG. 2A.
Figure 3A:
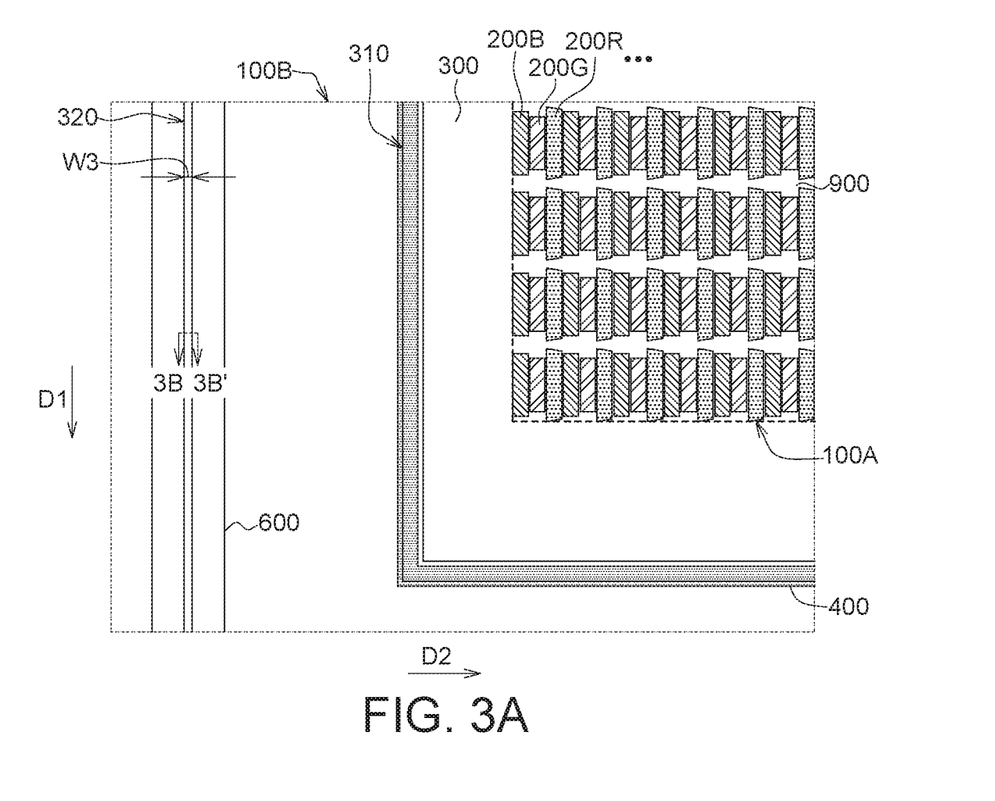
FIG. 3A is an enlarged view of the region 3A of FIG. 1.

FIG. 1 is a top view of a display device according to an embodiment of the present disclosure. FIG. 2A is an enlarged view of the region 2A of FIG. 1. FIG. 2B is a cross-sectional view along the cross-sectional line 2B-2B' of FIG. 2A. FIG. 3A is an enlarged view of the region 3A of FIG. 1. It should be noted that some of the structural details are omitted in the top view but are represented in the enlarged view.

As indicated in FIG. 1, FIG. 2A to FIG. 2B and FIG. 3A, the display device 10 includes a substrate 100, a plurality of sub-pixels and a covering layer 300. The substrate 100 includes a display area 100A and a peripheral area 100B adjacent to the display area 100A. The sub-pixels 200B are disposed in the display area 100A and arranged along a first direction D1. The sub-pixels 200B have a first color, and adjacent sub-pixels 200B have a first pixel pitch P1 along the first direction D1. The covering layer 300 is disposed in the peripheral area 100B and has a first recess 310. The first recess 310 has a first portion 310A extended along a second direction D2 different from the first direction D1. In one embodiment, the second direction D2 is perpendicular to the first direction D1. The first portion 310A has a first width W1 along the first direction D1. A ratio of the first width W1 to the first pixel pitch P1 (that is, W1/P1) is greater than or equal to 0.05 and less than or equal to 0.7. In an embodiment of the present disclosure, the second direction D2 is perpendicular to the first direction D1, and this represents that the angel between the first direction D1 and the second direction D2 is about 85-95°. In an embodiment of the present disclosure, the first portion 310A is extended along the second direction D2, and this represents that the first portion 310A is substantially a straight recess extended along the second direction D2 or a curved recess extended along the second direction D2.

In the present disclosure, the display area 100A may be defined as an illuminating area of the sub-pixels. In other words, the display area 100A may be defined as a virtual outermost boundary of the sub-pixels which could illuminate lights (as indicated by dash lines and labeled with 100A). In other words, the display device 10 may further include multiple dummy sub-pixels (not illustrated) which cannot illuminate but are disposed in the peripheral area 100B. In some embodiments, the display device may comprise liquid crystal (LC), organic light-emitting diodes (OLED), quantum dots (QD), a fluorescence material, a phosphor material, light-emitting diodes (LED), micro light-emitting diodes, mini light-emitting diodes, quantum dots light-emitting diodes (QLED) or other display media, but the present disclosure is not limited thereto. In some embodiments, the display device may be realized by a flexible display, a touch display, a curved display or a tiled display, but the present disclosure is not limited thereto.

In an embodiment, when the covering layer comprises a material (such as black matrix) with better conductivity, charges may be accumulated at the boundary between the peripheral area 100B and the display area 100A. Since the liquid crystal of the display device 10 is driven by the electric field to form the bright/dark state of the display frame, accumulation of charges in the peripheral area 100B may interfere with the electric field at the boundary of the display area 100A to cause abnormalities of the display frame (for example, the light may pass through even when the display frame is in the dark state) and affect the driving of the liquid crystal in the display area 100A. Conversely, according to an embodiment of the present disclosure, the covering layer 300 disposed in the peripheral area 100B has a first recess 310 which may interfere with the charges of the covering layer 300 to move to the display area 100A from the peripheral area 100B. Thus, the liquid crystal of the display area 100A is less interfered with by the electric field generated by the charges of the peripheral area 100B, and the abnormalities of the display frame may be decreased.

In an embodiment, the first recess 310 may interfere with the moisture entering the display area 100A from the peripheral area 100B and therefore prolong the lifespan of the display device (such as the organic light-emitting diode display device or the liquid crystal display device). In an embodiment, the covering layer may comprise an organic insulating layer, an inorganic insulating layer, a planarization layer, a pixel defined layer, or a black photoresist, but the present disclosure is not limited thereto. When the covering layer is a black photoresist, the covering layer also provides a light blocking effect, but the present disclosure is not limited thereto.

In some embodiments as indicated in FIG. 2A to FIG. 2B, the first width W1 is greater than or equal to 5 μm and less than or equal to 100 μm (i.e. 5 μm≤W1≤100 μm). In some other embodiments, the first width W1 is greater than or equal to 10 μm and less than or equal to 50 μm (i.e. 10 μm≤W1≤50 μm).

When the first width W1 of the first recess 310 is greater than 100 μm or a ratio of the first width W1 to the first pixel pitch P1 (that is, W1/P1) is greater than 0.7, the area of the peripheral area 100B might become too large to realize narrow border display device, or the size of the first recess 310 relative to the pixel size might be too large to be visible to human eyes.

When the first width W1 of the first recess 310 is less than 5 μm or a ratio of the first width W1 to the first pixel pitch P1 (that is, W1/P1) is less than 0.05, the size of the first recess 310 might be too small, and the moisture or charges of the peripheral area 100B may cross over the first recess 310 and interfere with the display quality at the boundary between the peripheral area 100B and the display area 100A. If the size of the first recess 310 relative to the pixel size is too small, the manufacturing process may reach its limit and increase the difficulties of manufacturing process.

According to an embodiment of the present disclosure, when the ratio of the first width W1 to the first pixel pitch P1 (that is, W1/P1) is greater than or equal to 0.05 and less than or equal to 0.7, the first recess 310 may interfere with the moisture or charges of the covering layer 300 to move to the display area 100A from the peripheral area 100B, or reduce the abnormalities of the display frame. The first recess 310 may not be invisible to human eyes (for example, the first recess 310 is invisible or unnoticeable to human eyes) or may be feasible to manufacturing process.

As indicated in FIG. 2A to FIG. 2B, the display device 10 further includes a first filler layer 400. At least a part of the first filler layer 400 is disposed in the first recess 310. The first filler layer 400 may provide a light blocking effect to the first recess 310.

In some embodiments as indicated in FIG. 2A to FIG. 2B, the first filler layer 400 includes a middle portion 410 and an extending portion 420. The middle portion 410 is disposed in the first recess 310 and connected to the extending portion 420. The extending portion 420 covers a part of the covering layer 300. In other words, the part of the first filler layer 400 disposed in the first recess 310 is defined as the middle portion 410, and the part of the first filler layer 400 disposed on the covering layer 300 is defined as the extending portion 420.

According to an embodiment of the present disclosure, the middle portion 410 of the first filler layer 400 is disposed in the first recess 310, the extending portion 420 of the first filler layer 400 is extended outside the first recess 310 and disposed on a part of the covering layer 300 on the two sides of the first recess 310 to assure that the first filler layer 400 completely fills the first recess 310, and the deviation or error of the manufacturing process will not affect the light blocking effect inside the first recess 310.

In some embodiments, when the first filler layer 400 comprises a low translucent material, a low conducting material, a light-absorption material, or a metal material, the first filler layer 400 may have a light blocking effect or interfere with the moisture or charges of the covering layer 300 to move to the display area 100A from the peripheral area 100B. The first filler layer 400 may comprise a material with an optical density (OD) greater than or equal to 0.1 and less than or equal to 3.5 (i.e. 0.1≤OD≤3.5), but the present disclosure is not limited thereto. In some embodiments, if the first filler layer comprises a material with a poor light blocking effect, a covering layer (such as a metal layer or metal traces) may be disposed on a corresponding position of other layers or the opposite substrate to help blocking the light or increase the invisibility of the first recess 310 to the human eyes.

In some embodiments, the first filler layer 400 may include a first photoresist. For example, the first filler layer 400 includes at least one of a red photoresist and a blue photoresist. In some embodiments, the first filler layer 400 may further include a second photoresist, that is, include at least two photoresists. For example, the first photoresist and the second photoresist respectively are a red photoresist or a blue photoresist. In some embodiments, the first filler layer 400 and the sub-pixels of the display area 100A may be formed in the same manufacturing process or multiple manufacturing processes.

In an embodiment as indicated in FIG. 2A to FIG. 2B, the display device 10 further includes a protection layer 500 disposed on the covering layer 300 and the first filler layer 400. In some embodiments, the protection layer 500 may be used as the planarization layer, such that after the covering layer 300 and the first filler layer 400 are formed, the substrate 100 may have a relatively planarization surface to benefit the subsequent manufacturing process (such as the alignment layer). In some embodiments, the protection layer 500 may comprise an organic insulating layer, an inorganic insulating layer or a combination thereof to reduce the sub-pixels of the display area 100A being affected by moisture or oxygen.

In some embodiments, the first recess 310 may have an enclosed structure and surround the display area 100A. In an embodiment as indicated in FIG. 1, the first recess 310 may have an enclosed, oblong structure and surround the display area 100A to provide a better effect for interfering charges or moisture or oxygen.

As indicated in FIG. 2A, a first distance S1 extended along the first direction D1 is formed between the first recess 310 and the display area 100A. In an embodiment, the first distance S1 is the greatest distance between the first recess 310 and the display area 100A. The first distance S1 is greater than the first pixel pitch P1. In an embodiment, the first pixel pitch P1 represents the distance between the centers of two adjacent sub-pixels of the same color along the first direction D1, or the distance between the same side of two adjacent sub-pixels of the same color (as indicated in FIG. 2A, such as the distance from the underside of the first sub-pixel to the underside of the second sub-pixel), or the distance between the same part of two adjacent sub-pixels of the same color (such as the distance from the top-left corner of the first sub-pixel to the top-left corner of the second sub-pixel)."

As indicated in FIG. 1, FIG. 2A to FIG. 2B, the sub-pixels 200B have a second pixel pitch P2 along the second direction D2. In an embodiment, the second pixel pitch P2 represents the distance between the centers of two adjacent sub-pixels of the same color along the second direction D2, or the distance between the same side of two adjacent sub-pixels of the same color (such as the distance from the left-side of the first sub-pixel to the left-side of the second sub-pixel), or the distance between the same part of two adjacent sub-pixels of the same color (as indicated in FIG. 2A, such as the distance from the top-left corner of the first sub-pixel to the top-left corner of the second sub-pixel). In an embodiment, the first pixel pitch P1 and the second pixel pitch P2 may substantially be the same, but the present disclosure is not limited thereto. In other embodiments, the first pixel pitch P1 and the second pixel pitch P2 may be different. Also, the first recess 310 includes several portions respectively disposed outside the display area 100A, wherein two or more of those portions can be separately disposed or connected to each other. As shown in FIG. 2B, the first recess 310 further has a second portion 310B along the first direction D1. The second portion 310B has a second width W2 along the second direction D2. A ratio of the second width W2 to the second pixel pitch P2 (W2/P2) is greater than or equal to 0.05 and less than or equal to 0.7. In an embodiment, the first portion 310A may connect the second portion 310B; for example, the junction between the first portion 310A and the second portion 310B in FIG. 2B may further include a third portion 310C used for connecting the first portion 310A and the second portion 310B. In an embodiment, the first portion 310A and the second portion 310B may be designed as recesses of different widths, the first width W1 or the second width W2 may be designed as the minimum width in a local region.

The display device 10 may include sub-pixels 200B, 200G and 200R of different colors. The sub-pixels 200B may be blue sub-pixels. The sub-pixels 200G may be green sub-pixels. The sub-pixels 200R may be red sub-pixels. Three sub-pixels 200B, 200G and 200R may form a pixel unit. The three sub-pixels 200B, 200G and 200R may have identical or different sizes or shapes. The first pixel pitch P1 or the second pixel pitch P2 may be defined by the sub-pixels of any color selected from the three sub-pixels 200B, 200G and 200R. In some embodiments, the sub-pixels in the display area 100A may comprise photoresists of different colors, but the present disclosure is not limited thereto. In other embodiments, the sub-pixels in the display area 100A may comprise organic light-emitting diodes, quantum dots, a fluorescence material, a phosphor material, light-emitting diodes, micro light-emitting diodes, mini light-emitting diodes, quantum dot light-emitting diodes or other display media, but the present disclosure is not limited thereto.

As indicated in FIG. 2A, a second distance S2 extended along the second direction D2 and greater than the second pixel pitch P2 is formed between the first recess 310 and the display area 100A.

In some embodiments as indicated in FIG. 2A to FIG. 2B, the second width W2 is greater than or equal to 5 μm and less than or equal to 100 μm (i.e. 5 μm≤W2≤100 μm). In some other embodiments, the second width W2 is greater than or equal to 10 μm and less than or equal to 50 μm (i.e. 10 μm≤W1≤50 μm). According to an embodiment of the present disclosure, the second width W2 may be designed to have functions similar with the first width W1, and the similarities are not repeated again.

Figure 3B:
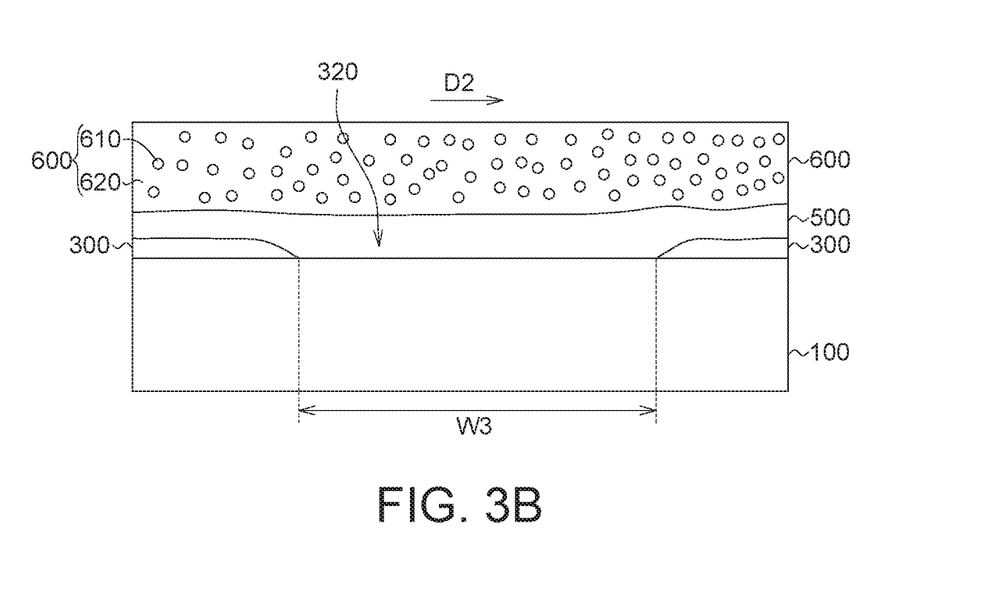
FIG. 3B is a cross-sectional view along the cross-sectional line 3B-3B' of FIG. 3A.

As indicated in FIG. 1, FIG. 3A to FIG. 3B, the covering layer 300 further has a second recess 320. At least a part of the first recess 310 is disposed between the display area 100A and the second recess 320.

According to an embodiment of the present disclosure, the second recess 320 could also interfere with the charges or moisture or oxygen moving to the display area 100A.

In some embodiments as indicated in FIG. 3A to FIG. 3B, the second recess 320 has a third width W3 along a direction perpendicular to the extending direction (such as the second direction D2 in the embodiment in FIG. 3A). The third width W3 is greater than or equal to 5 μm and less than or equal to 100 μm (i.e. 5 μm≤W3≤100 μm). In some other embodiments, the third width W3 of the second recess 320 is greater than or equal to 10 μm and less than or equal to 50 μm (i.e. 10 μm≤W3≤50 μm).

In some embodiments, the second recess 320 may have an enclosed structure and surround the first recess 310. Or, the second recess 320 may have multiple separated sections respectively disposed outside the first recess 310. In an embodiment as indicated in FIG. 1, the second recess 320 has an enclosed, polygonal structure and surrounds the first recess 310 to enhance the effect of interfering the charges or moisture or oxygen moving to the display area 100A.

The first width W1, the second width W2, the first pixel pitch P1, the second pixel pitch P2, the first distance S1, the second distance S2 of the first recess 310 and the third width W3 of the second recess 320 of the display device 10 according to some examples of the embodiment are listed in Table 1. The length unit of different designs in Table 1 is micrometer (μm). Although several examples of the embodiments are listed in Table 1, it should be noted that these design parameters are not disclosed for limiting the present disclosure. Anyone skilled in the technical field of the disclosure will be able to make suitable modifications or changes based on the specification disclosed above to meet actual needs without departing from the spirit of the present disclosure.

TABLE 1

| | Example | | | | | | |
|---|---|---|---|---|---|---|---|
| | 1 | 2 | 3 | 4 | 5 | 6 | 7 |
| W1 | 21.83 | 23.50 | 33.87 | 31.55 | 36.65 | 34.79 | 33.87 |
| P1 | 191.45 | 204.61 | 60.46 | 59.85 | 59.85 | 63.25 | 80.88 |
| W1/P1 | 0.11 | 0.11 | 0.56 | 0.53 | 0.61 | 0.55 | 0.42 |
| W2 | 23.41 | 20.60 | 34.33 | 32.01 | 33.86 | 31.54 | 33.40 |
| P2 | 192.59 | 206.33 | 60.77 | 61.39 | 60.46 | 63.01 | 81.33 |
| W2/P2 | 0.12 | 0.10 | 0.56 | 0.52 | 0.56 | 0.50 | 0.41 |
| S1 | 458.74 | 488.82 | 190.21 | 48.25 | 46.86 | 79.33 | 59.85 |
| S1/P1 | 2.40 | 2.39 | 3.15 | 0.81 | 0.78 | 1.25 | 0.74 |
| S2 | 533.76 | 497.24 | 27.83 | 42.21 | 39.89 | 49.17 | 60.77 |
| S2/P2 | 2.77 | 2.41 | 0.46 | 0.69 | 0.66 | 0.78 | 0.75 |
| W3 | — | 25.28 | 11.13 | 10.21 | 12.52 | 12.52 | 11.59 |

As indicated in Table 1, the parameter design of embodiments 1-2 may be used in the display device with lower requirement of pixel resolution, and the parameter design of embodiment 3-7 may be used in the display device with higher requirement of pixel resolution, but the present disclosure is not limited thereto.

As indicated in FIG. 3A to FIG. 3B, the display device 10 further includes a sealant layer 600 disposed on the second recess 320.

In some embodiments as indicated in FIG. 3B, the sealant layer 600 may include a plurality of filling particles 610 and an adhesive layer 620. The filling particles 610 are mixed in the adhesive layer 620. In some embodiments, the filling particles 610, such as inorganic particles, has better mechanical strength and provides better support than the adhesive layer 620. In some embodiments, the filling particles 610 or the adhesive layer 620 comprise a light-absorption material. When the sealant layer 600 with light-absorption effect is disposed above the second recess 320, the light blocking effect at the second recess 320 of the covering layer 300 could be enhanced.

In some embodiments, the protection layer 500 is disposed on the covering layer 300 but inside the second recess 320, and the sealant layer 600 is disposed on the protection layer 500.

In some embodiments as indicated in FIG. 1, FIG. 2A to FIG. 2B and FIG. 3A to FIG. 3B, the display device 10 may further include a light blocking structure 900 disposed in the display area 100A. The light blocking structure 900 is used for separating multiple sub-pixels in the display area 100A to reduce the phenomenon of light mixing between sub-pixels of different colors. In an embodiment, the light blocking structure 900 and the covering layer 300 may comprise the same or different materials by the same or different manufacturing processes. In some embodiments, the light blocking structure 900 and the covering layer 300 may be formed by the same manufacturing process and advantageously have a simplified manufacturing process.

Figure 4A:
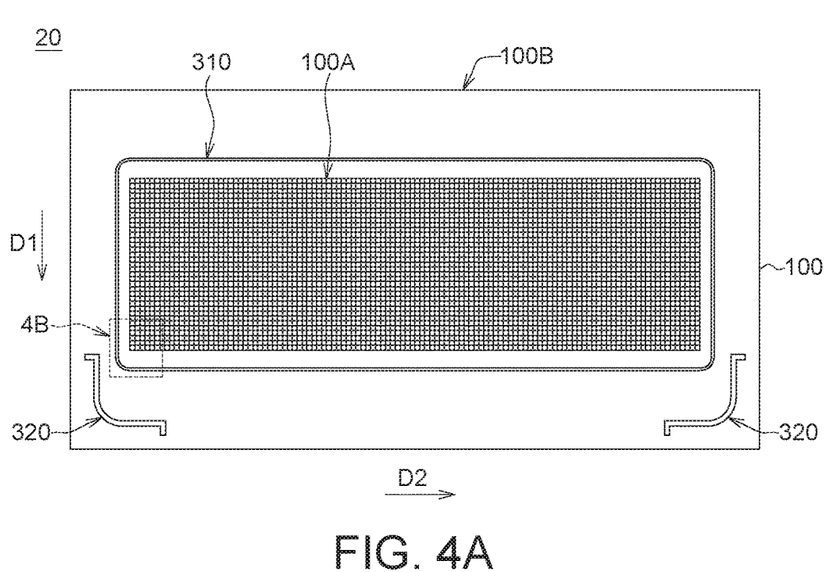
FIG. 4A is a top view of a display device according to another embodiment of the present disclosure.
Figure 4B:
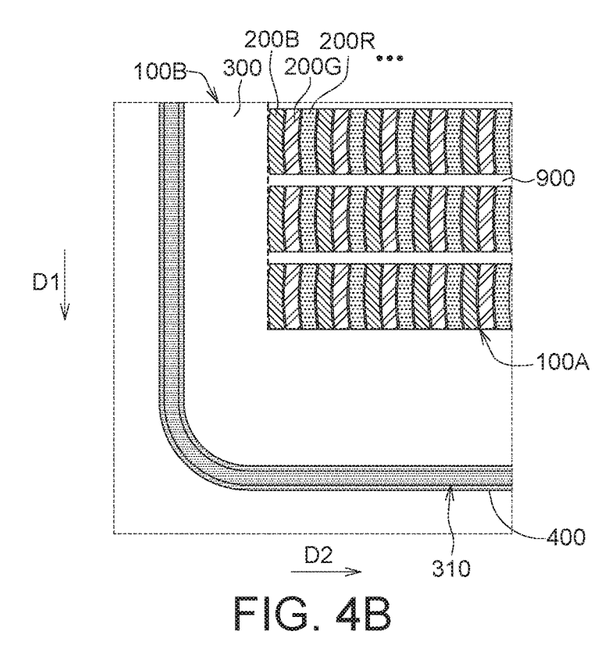
FIG. 4B is an enlarged view of the region 4B of FIG. 4A.

FIG. 4A is a top view of a display device according to another embodiment of the present disclosure. FIG. 4B is an enlarged view of the region 4B of FIG. 4A. It should be noted that some of the structural details are omitted in the top view but are illustrated in the enlarged view. For elements of the present embodiment similar or identical to that of above embodiments, similar or identical designations are used. Relevant descriptions of similar or identical elements which may be obtained with reference to above disclosure are not repeated again.

In some embodiments, the second recess 320 may have an enclosed structure and surrounds the display area 100A (As indicated in FIG. 1) or the second recess 320 may have multiple separate sections disposed outside the first recess 310. As indicated in FIG. 4A to FIG. 4B, the first recess 310 of the covering layer 300 of the display device 20 has an enclosed structure and surrounds the display area 100A, and the second recess 320 of the covering layer 300 includes two separate sections both having an arced structure.

Figure 5A:
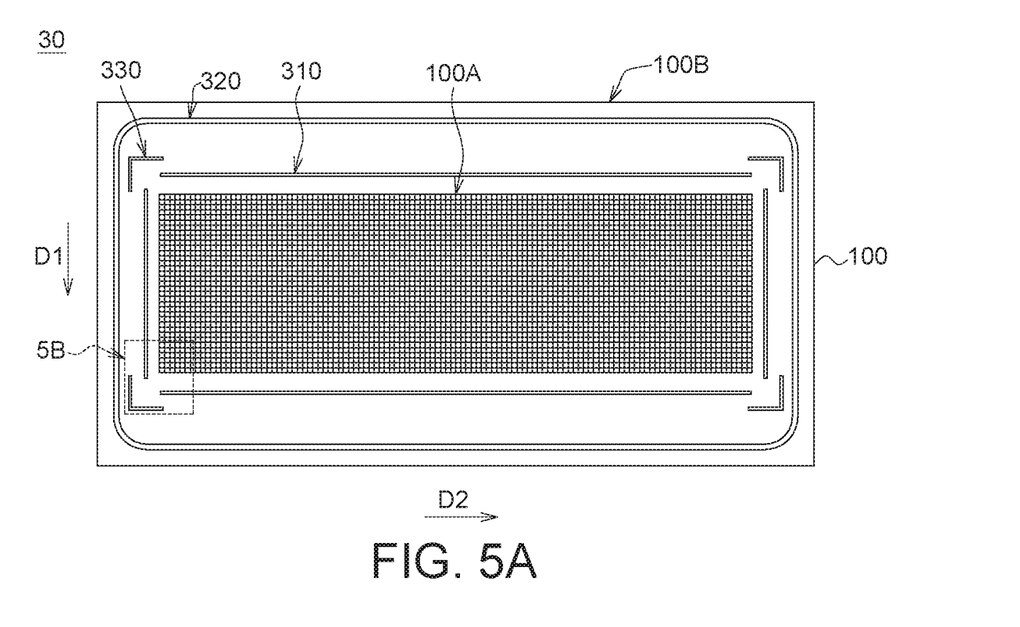
FIG. 5A is a top view of a display device according to an alternate embodiment of the present disclosure.
Figure 5B:
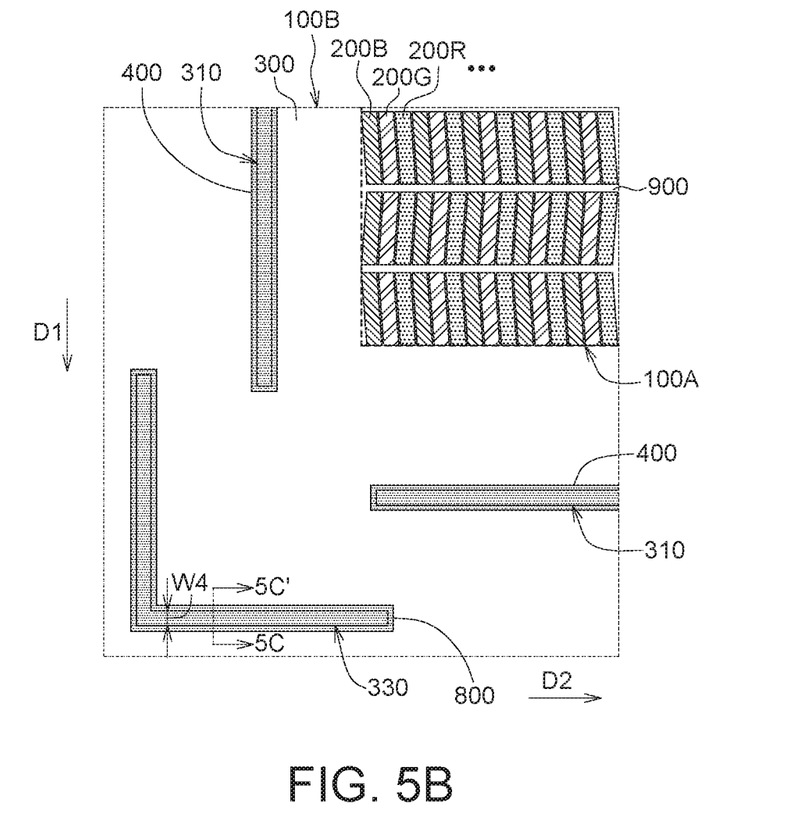
FIG. 5B is an enlarged view of the region 5B of FIG. 5A.
Figure 5C:
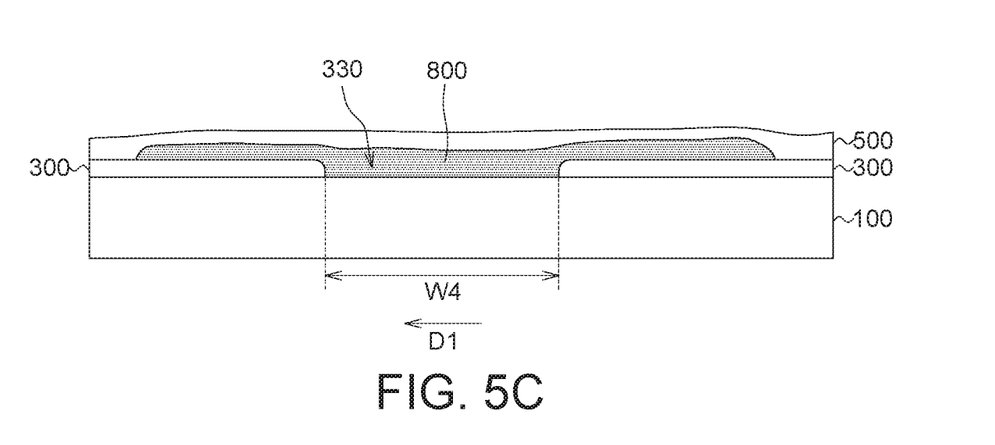
FIG. 5C is a cross-sectional view along the cross-sectional line 5C-5C' of FIG. 5B.

FIG. 5A is a top view of a display device according to an alternate embodiment of the present disclosure. FIG. 5B is an enlarged view of the region 5B of FIG. 5A. FIG. 5C is a cross-sectional view along the cross-sectional line 5C-5C' of FIG. 5B. It should be noted that some of the structural details are omitted in the top view but are represented in the enlarged view. For elements of the present embodiment similar or identical to that of above embodiments, similar or identical designations are used. Relevant descriptions of similar or identical elements which may be obtained with reference to above disclosure are not repeated here.

As indicated in FIG. 5A to FIG. 5C, the covering layer 300 further has a third recess 330, the third recess 330 is disposed between the first recess 310 and the second recess 320. According to an embodiment of the present disclosure, the covering layer 300 in the peripheral area 100B disposed outside the display area 100A has multiple recesses (such as the first recess 310, the second recess 320 and/or the third recess 330) each having an enclosed structure or multiple separate sections. The recesses interfere with the moisture or charges of the covering layer 300 to move to the display area 100A from the peripheral area 100B. Thus, the liquid crystal of the display area 100A is less interfered with by charges or moisture, and the abnormalities of the display frame may be decreased.

As indicated in FIG. 5B to FIG. 5C, the display device 30 may further include a second filler layer 800 disposed in the third recess 330. In some embodiments, the material selection of the second filler layer 800 and the disposition of the second filler layer 800 with respect to the third recess 330 are similar to the design of the first filler layer 400 and the first recess 310 as disclosed in above embodiments, and the similarities are not repeated again.

In some embodiments, the width W4 of the third recess 330 is greater than or equal to 5 μm and less than or equal to 100 μm (i.e. 5 μm≤W4≤100 μm). In some other embodiments, the width W4 of third recess 330 is greater than or equal to 10 μm and less than or equal to 50 μm (i.e. 10 μm≤W4≤50 μm).

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a substrate, comprising a display area and a peripheral area adjacent to the display area;
   a plurality of sub-pixels disposed in the display area and arranged along a first direction, wherein the plurality of sub-pixels have a first color, and two adjacent ones of the plurality of sub-pixels have a first pixel pitch along the first direction;
   a covering layer disposed in the peripheral area and having a first recess and a second recess;
   a sealant layer, disposed on the second recess, wherein the sealant layer does not overlap with the first recess in a normal direction of the substrate;

a first filler layer disposed in the first recess and not disposed in the second recess; and a protection layer having a first part and a second part, wherein the first part is disposed between the sealant layer and the covering layer, and the second part is inside the second recess and contacts a part of the substrate which is exposed by the second recess, wherein the first recess is disposed between the display area and the second recess, and the first recess has a first portion extended along a second direction perpendicular to the first direction; and wherein the first portion has a first width along the first direction, and a ratio of the first width to the first pixel pitch is greater than or equal to 0.05 and less than or equal to 0.7.

* * * * *